United States Patent
Kohri et al.

(10) Patent No.: US 10,640,634 B2
(45) Date of Patent: May 5, 2020

(54) FLAME RETARDANT RESIN COMPOSITION AND METAL CABLE, OPTICAL FIBER CABLE, AND MOLDED ARTICLE USING THE SAME

(71) Applicant: FUJIKURA LTD., Tokyo (JP)

(72) Inventors: Haruka Kohri, Chiba (JP); Shoichiro Nakamura, Chiba (JP); Tomohisa Watanabe, Chiba (JP)

(73) Assignee: Fujikura Ltd., Tokyo (JP)

( * ) Notice: Subject to any disclaimer, the term of this patent is extended or adjusted under 35 U.S.C. 154(b) by 20 days.

(21) Appl. No.: 16/062,044

(22) PCT Filed: Dec. 5, 2016

(86) PCT No.: PCT/JP2016/086013
§ 371 (c)(1),
(2) Date: Jun. 13, 2018

(87) PCT Pub. No.: WO2017/104456
PCT Pub. Date: Jun. 22, 2017

(65) Prior Publication Data
US 2018/0371220 A1   Dec. 27, 2018

(30) Foreign Application Priority Data

Dec. 14, 2015   (JP) ................. 2015-242943

(51) Int. Cl.
*H01B 3/44* (2006.01)
*C08L 23/08* (2006.01)
(Continued)

(52) U.S. Cl.
CPC ............ *C08L 23/0853* (2013.01); *C08K 3/22* (2013.01); *C08K 5/09* (2013.01); *C08K 5/098* (2013.01);
(Continued)

(58) Field of Classification Search
CPC ...... C08L 23/06; C08L 83/04; C08L 2201/02; C08L 2203/202; C08L 23/00;
(Continued)

(56) References Cited

U.S. PATENT DOCUMENTS 6,429,246 B1 *  8/2002  Rous ................. C08L 23/06
                                                    524/268
8,471,031 B2 *  6/2013  Schoning ............ C07D 211/94
                                                    544/198
(Continued)

FOREIGN PATENT DOCUMENTS

CN    1530393 A    9/2004
CN    1685003 A    10/2005
(Continued)

OTHER PUBLICATIONS

Office Action issued in corresponding Taiwanese Patent Application No. 105141070 dated Sep. 27, 2017 (6 pages).
(Continued)

*Primary Examiner* — Mark Kopec
*Assistant Examiner* — Jaison P Thomas
(74) *Attorney, Agent, or Firm* — Osha Liang LLP

(57) ABSTRACT

A flame retardant resin composition containing a polyolefin resin, a silicone compound, a fatty acid containing compound, aluminum hydroxide, and a triazine ring containing hindered amine compound. With respect to 100 parts by mass of the polyolefin resin, the silicone compound is blended in an amount of the range 0.5 to 10 parts by mass, the fatty acid containing compound is blended in an amount of the range 0.5 to 20 parts by mass, the aluminum hydroxide is blended in an amount of the range 1 to 60 parts by mass, and the triazine ring containing hindered amine compound is blended in an amount of the range 0.05 to 8 parts
(Continued)

by mass or less. The triazine ring containing hindered amine compound may include an oxygen atom.

12 Claims, 3 Drawing Sheets

(51) Int. Cl.
| | |
|---|---|
| C08K 3/22 | (2006.01) |
| C08K 5/098 | (2006.01) |
| C08L 83/04 | (2006.01) |
| H01B 7/02 | (2006.01) |
| C08K 5/3492 | (2006.01) |
| C08L 23/00 | (2006.01) |
| C08K 5/09 | (2006.01) |
| H01B 7/295 | (2006.01) |
| G02B 6/44 | (2006.01) |
| C08L 23/06 | (2006.01) |
| C08L 23/12 | (2006.01) |
| C08L 23/26 | (2006.01) |

(52) U.S. Cl.
CPC ........ *C08K 5/3492* (2013.01); *C08K 5/34926* (2013.01); *C08L 23/00* (2013.01); *C08L 23/06* (2013.01); *C08L 23/12* (2013.01); *C08L 23/26* (2013.01); *C08L 83/04* (2013.01); *G02B 6/44* (2013.01); *H01B 3/44* (2013.01); *H01B 7/02* (2013.01); *H01B 7/295* (2013.01); *C08K 2003/2227* (2013.01); *C08L 2201/02* (2013.01); *C08L 2203/202* (2013.01)

(58) Field of Classification Search
CPC ...... C08L 23/0853; C08L 23/12; C08L 23/26; C08K 3/22; C08K 5/098; C08K 5/3492; C08K 5/34926; C08K 2003/2227; C08K 5/09; G02B 6/44; H01B 3/44; H01B 7/02; H01B 7/295
See application file for complete search history.

(56) References Cited

U.S. PATENT DOCUMENTS

| | | | | |
|---|---|---|---|---|
| 10,106,743 | B2 * | 10/2018 | Iwata | C08L 83/04 |
| 2004/0106709 | A1 * | 6/2004 | Toshimitsu | C08K 3/22 |
| | | | | 524/261 |
| 2011/0034587 | A1 * | 2/2011 | Lee | C08K 5/0066 |
| | | | | 523/220 |
| 2017/0051136 | A1 * | 2/2017 | Kohri | C08K 5/098 |
| 2017/0051208 | A1 * | 2/2017 | Iwata | C08L 83/04 |

FOREIGN PATENT DOCUMENTS

| | | |
|---|---|---|
| CN | 104231266 A | 12/2014 |
| EP | 1452559 A1 | 9/2004 |
| EP | 3078709 A1 | 10/2016 |
| EP | 3147322 A1 | 3/2017 |
| JP | 2002-324440 A | 11/2002 |
| JP | 2004-219815 A | 8/2004 |
| JP | 2006-147236 A | 6/2006 |
| JP | 4074681 B2 | 4/2008 |
| JP | 2015-221865 A | 12/2015 |
| WO | 2004031286 A1 | 4/2004 |
| WO | 2015/083737 A1 | 6/2015 |
| WO | 2015/178151 A1 | 11/2015 |

OTHER PUBLICATIONS

Office Action issued in corresponding Japanese Patent Application No. 2016-571363 dated Mar. 21, 2017 (3 pages).
Decision of Refusal issued in corresponding Taiwanese Patent Application No. 105141070 dated Mar. 23, 2018 (4 pages).
Extended European Search Report (EESR) issued in corresponding European Application No. 16875439.8 dated Aug. 2, 2019 (7 pages).
Office Action issued in corresponding Chinese Patent Application No. 201680050662.7, dated Sep. 20, 2019 (9 pages).

* cited by examiner

FLAME RETARDANT RESIN COMPOSITION AND METAL CABLE, OPTICAL FIBER CABLE, AND MOLDED ARTICLE USING THE SAME

TECHNICAL FIELD

One or more embodiments of the present invention relate to a flame retardant resin composition and a metal cable, an optical fiber cable, and a molded article using the same.

BACKGROUND

So-called eco-materials are widely used for covering of cables, outer sheaths of cables, tubes, tapes, packaging materials, building materials and the like.

As such an eco-material, a flame retardant resin composition in which a silicone compound such as silicone gum or the like and a fatty acid-containing compound such as magnesium stearate or the like as a flame retardant aid as well as a metal hydroxide as a flame retardant are added to a polyolefin resin is known (See Patent Document 1 below).

CITATION LIST

Patent Document

Patent Document 1: JP 4074681 B

However, it is difficult to say that flame retardancy is sufficiently secured by the flame retardant resin composition described in the above Patent Document 1. Herein, if an addition amount of the flame retardant is increased, the flame retardancy can be improved. However, in such embodiments, the mechanical characteristics of the flame retardant resin composition deteriorate.

For this reason, a flame retardant resin composition which can secure excellent mechanical characteristics as well as excellent flame retardancy has been required.

The present invention has been made in consideration of the aforementioned circumstances, and one or more embodiments of the present invention provide a flame retardant resin composition which can secure excellent mechanical characteristics as well as excellent flame retardancy, a metal cable, an optical fiber cable and a molded article using the flame retardant resin composition.

SUMMARY

The present inventors have found that suitable mechanical characteristics and flame retardancy may be obtained by blending, to a polyolefin resin, aluminum hydroxide, a silicone compound, a fatty acid containing compound and a triazine ring containing hindered amine compound, each at a predetermined ratio, as well as using a triazine ring containing hindered amine compound containing an oxygen atom, as the triazine ring containing hindered amine compound.

One or more embodiments of the present invention are directed towards a flame retardant resin composition containing a polyolefin resin, a silicone compound, a fatty acid containing compound, and a triazine ring containing hindered amine compound, in which the silicone compound is blended at a ratio of 0.5 part by mass or more and 10 parts by mass or less relative to 100 parts by mass of the polyolefin resin, the fatty acid containing compound is blended at a ratio of 0.5 part by mass or more and 20 parts by mass or less relative to 100 parts by mass of the polyolefin resin, the aluminum hydroxide is blended at a ratio of 1 part by mass or more and 60 parts by mass or less relative to 100 parts by mass of the polyolefin resin, the triazine ring containing hindered amine compound is blended at a ratio of 0.05 part by mass or more and 8 parts by mass or less relative to 100 parts by mass of the polyolefin resin, and the triazine ring containing hindered amine compound includes an oxygen atom.

According to the flame retardant resin composition of one or more embodiments of the present invention, excellent mechanical characteristics as well as excellent flame retardancy can be secured.

Incidentally, the present inventors presume the reason why the above effect is obtained in the flame retardant resin composition of one or more embodiments of the present invention as follows.

In one or more embodiments, when aluminum hydroxide is contained in the flame retardant resin composition, aluminum hydroxide itself causes heat absorption by dehydration at a relatively low temperature at the early stage of combustion of the flame retardant resin composition. By this heat absorption by dehydration, the temperature rise and ignition of the polyolefin resin in the flame retardant resin composition are suppressed or continuation of combustion is hindered. In addition, when aluminum hydroxide, a silicone compound, and a fatty acid containing compound are contained in the flame retardant resin composition, a barrier layer which is considered as being mainly composed of aluminum hydroxide, the silicone compound, the fatty acid containing compound and a decomposed product is formed and thus combustion of the polyolefin resin is suppressed. On the other hand, when a triazine ring containing hindered amine compound including an oxygen atom is contained in the flame retardant resin composition, oxygen radicals are generated from the triazine ring containing hindered amine compound at the time of combustion of the flame retardant resin composition, and those oxygen radicals capture hydrogen radicals that are generated due to decomposition of the polyolefin resin at the time of combustion. Thereby, combustion of the polyolefin resin is suppressed. For that reason, it is considered that, due to a synergistic effect of the three kinds of flame retardant actions of heat absorption by dehydration, formation of the barrier layer and the radical capturing effect at the time of combustion, excellent flame retardancy may be obtained. Accordingly, it becomes possible to reduce the blending amount of aluminum hydroxide relative to the polyolefin resin, and, as a result, it is considered that excellent mechanical characteristics may be secured.

In the flame retardant resin composition of one or more embodiments, it is preferable that the triazine ring containing hindered amine compound may be a compound having a group represented by the following formula (1).

[Chem. 1]

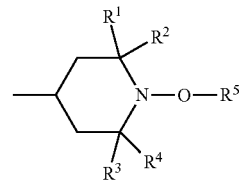

(1)

(in the above formula (1), $R^1$ to $R^4$ are each independently an alkyl group having 1 to 8 carbon atoms, $R^5$ is an alkyl group having 1 to 18 carbon atoms, a cycloalkyl group having 5 to 12 carbon atoms, an aralkyl group having 7 to 25 carbon atoms, or an aryl group having 6 to 12 carbon atoms)

In such embodiments, more excellent flame retardancy is obtained in the flame retardant resin composition.

In the flame retardant resin composition of one or more embodiments, it is preferable that the triazine ring containing hindered amine compound be blended at a ratio of 3 parts by mass or less relative to 100 parts by mass of the polyolefin resin.

In such embodiments, as compared to an embodiment in which the blending ratio of the triazine ring containing hindered amine compound relative to 100 parts by mass of the polyolefin resin is greater than 3 parts by mass, blooming is less likely to occur in the flame retardant resin composition.

In the flame retardant resin composition of one or more embodiments, it is preferable that the aluminum hydroxide be blended at a ratio of less than 50 parts by mass relative to 100 parts by mass of the polyolefin resin.

In such embodiments, as compared to an embodiment in which the blending ratio of the aluminum hydroxide relative to 100 parts by mass of the polyolefin resin is out of the above range, the mechanical characteristics of the flame retardant resin composition can be more sufficiently improved.

In the flame retardant resin composition of one or more embodiments, it is preferable that the aluminum hydroxide be blended at a ratio of less than 40 parts by mass relative to 100 parts by mass of the polyolefin resin.

In such embodiments, as compared to an embodiment in which the blending ratio of the aluminum hydroxide relative to 100 parts by mass of the polyolefin resin is out of the above range, the mechanical characteristics of the flame retardant resin composition can be more sufficiently improved.

In the flame retardant resin composition of one or more embodiments, it is preferable that the fatty acid containing compound be blended at a ratio of 0.5 part by mass or more and 10 parts by mass or less relative to 100 parts by mass of the polyolefin resin, and the aluminum hydroxide be blended at a ratio of 1 part by mass or more and less than 5 parts by mass relative to 100 parts by mass of the polyolefin resin.

In such embodiments, more excellent mechanical characteristics are obtained in the flame retardant resin composition, as compared to a case in which the blending ratios of the fatty acid containing compound and aluminum hydroxide relative to 100 parts by mass of the polyolefin resin exceed the above upper limits. Moreover, more excellent flame retardancy is obtained in the flame retardant resin composition, as compared to a case in which the blending ratios of the fatty acid containing compound and aluminum hydroxide relative to 100 parts by mass of the polyolefin resin are less than the above lower limits.

In the flame retardant resin composition of one or more embodiments, it is preferable that the polyolefin resin be composed of at least one kind selected from the group consisting of polyethylene, acid-modified polyethylene, an ethylene-vinyl acetate copolymer, an ethylene-ethyl acrylate copolymer, and polypropylene.

In the flame retardant resin composition of one or more embodiments, it is preferable that the fatty acid containing compound be magnesium stearate or calcium stearate.

In such embodiments, as compared to a case in which the fatty acid containing compound is a fatty acid containing compound other than magnesium stearate and calcium stearete, more excellent flame retardancy can be obtained at a smaller addition amount in the flame retardant resin composition.

The flame retardant resin composition of one or more embodiments has a specific gravity of 1 or less.

In such embodiments, as compared to a case in which the specific gravity of the flame retardant resin composition is greater than 1, it is possible to float the flame retardant resin composition on water. For this reason, when centrifugal separation processing is conducted by removing an insulating body from a metal cable or an optical fiber cable comprising the insulating body composed of the flame retardant resin composition and floating this insulating body on water, it is possible to efficiently collect the insulating body. For this reason, it is possible to efficiently recycle the flame retardant resin composition.

Furthermore, one or more embodiments of the present invention are directed towards a metal cable including a metal conductor and an insulating body covering the metal conductor, in which the insulating body is composed of the flame retardant resin composition described above.

Moreover, one or more embodiments of the present invention is an optical fiber cable including an optical fiber and an insulating body covering the optical fiber, in which the insulating body is composed of the flame retardant resin composition described above.

In addition, one or more embodiments of the present invention is a molded article including the flame retardant resin composition described above.

According to the molded article of one or more embodiments of the present invention, it is possible to secure excellent mechanical characteristics as well as excellent flame retardancy.

Incidentally, in one or more embodiments of the present invention, the specific gravity of the flame retardant resin composition refers to a value measured by an underwater substitution method based on JIS K7112.

According to one or more embodiments of the present invention, a flame retardant resin composition which can secure excellent mechanical characteristics as well as excellent flame retardancy, a metal cable, an optical fiber cable and a molded article using the flame retardant resin composition are provided.

DETAILED DESCRIPTION OF THE EMBODIMENTS

Hereinbelow, the embodiments of one or more embodiments of the present invention are explained in detail using FIG. 1 and FIG. 2.

[Metal Cable]

Figure 1:
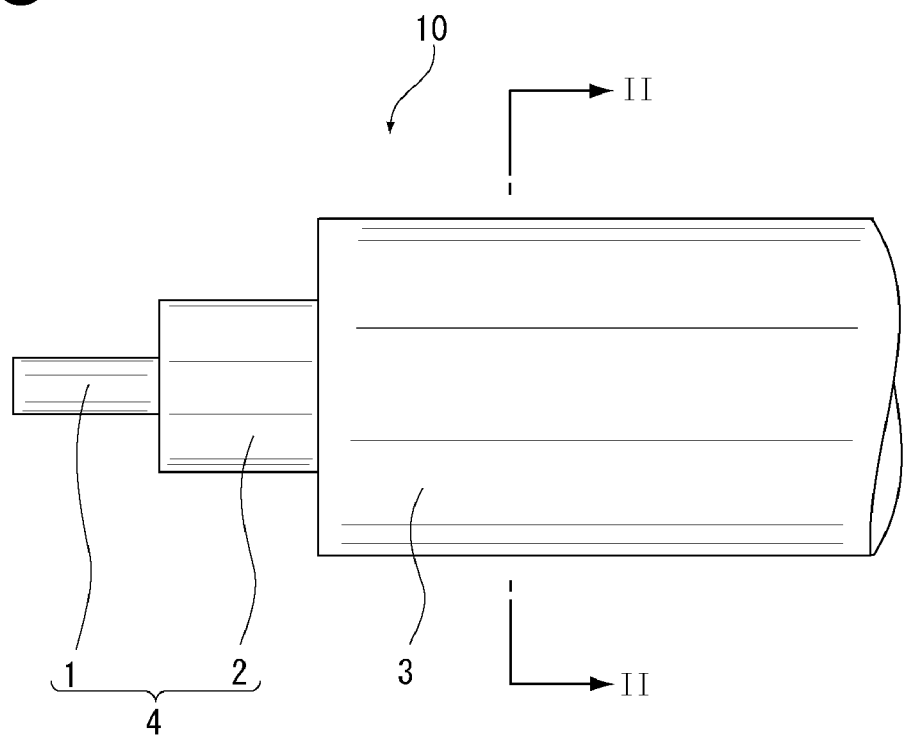
FIG. 1 is a partial side view illustrating an embodiment of the metal cable of one or more embodiments of the present invention.
Figure 2:
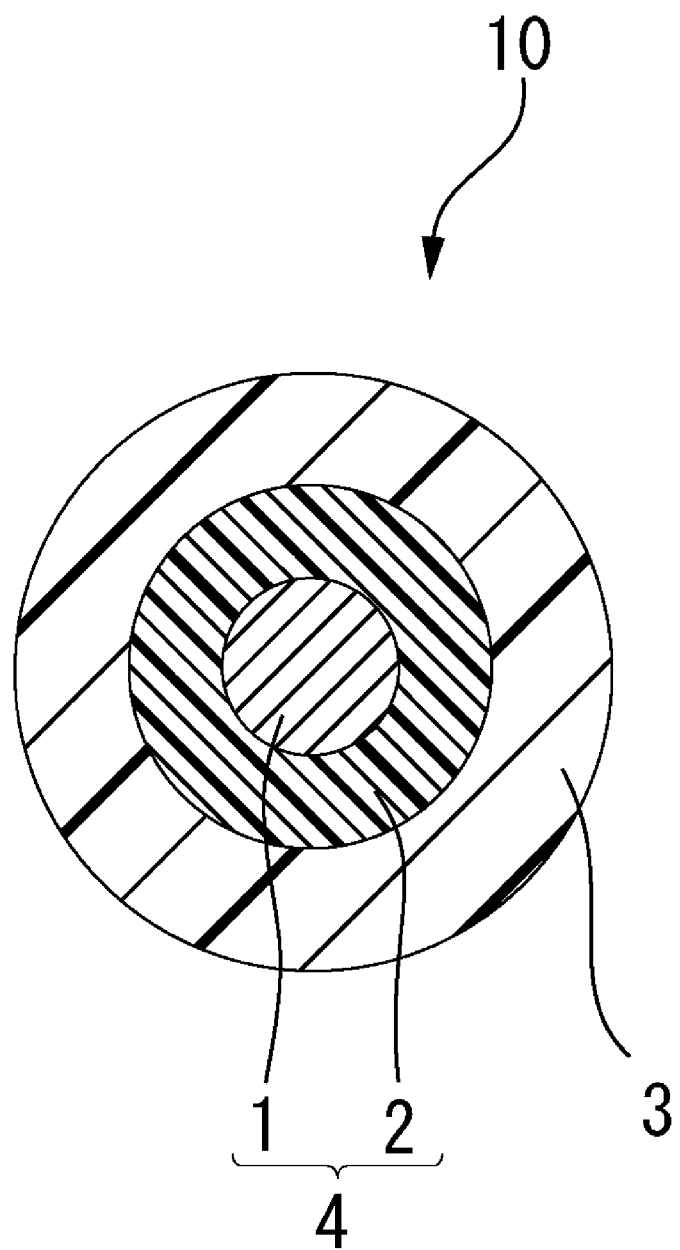
FIG. 2 is a cross-sectional view taken along the line II-II of FIG. 1.

FIG. 1 is a partial side view illustrating an embodiment of the metal cable according to one or more embodiments of the present invention. FIG. 2 is a cross-sectional view taken along the line II-II of FIG. 1. As shown in FIG. 1 and FIG. 2, a round cable 10 as a metal cable comprises an insulating wire 4 and a tubular outer sheath 3 as an insulating body covering the insulating wire 4. Furthermore, the insulating wire 4 has an internal conductor 1 as a metal conductor and a tubular insulating body 2 covering the internal conductor 1. Namely, in the round cable 10, the tubular outer sheath 3 indirectly covers the internal conductor 1.

Herein, the tubular insulating body 2 and the outer sheath 3 are composed of a flame retardant resin composition, and this flame retardant resin composition contains a polyolefin resin, a silicone compound, a fatty acid containing compound, aluminum hydroxide, and a triazine ring containing hindered amine compound. In the flame retardant resin composition of one or more embodiments, the silicone compound is blended at a ratio of 0.5 part by mass or more and 10 parts by mass or less relative to 100 parts by mass of the polyolefin resin, the fatty acid containing compound is blended at a ratio of 0.5 part by mass or more and 20 parts by mass or less relative to 100 parts by mass of the polyolefin resin, the aluminum hydroxide is blended at a ratio of 1 part by mass or more and 60 parts by mass or less relative to 100 parts by mass of the polyolefin resin, the triazine ring containing hindered amine compound is blended at a ratio of 0.05 part by mass or more and 8 parts by mass or less relative to 100 parts by mass of the polyolefin resin, and the triazine ring containing hindered amine compound includes an oxygen atom.

The insulating body 2 and the outer sheath 3 composed of the above-mentioned flame retardant resin composition can secure excellent mechanical characteristics as well as excellent flame retardancy.

[Method for Producing a Metal Cable]

Next, explanations are given for the method for producing the round cable 10 described above.

<Metal Conductor>

First, the internal conductor 1 as a metal conductor is prepared. The internal conductor 1 may be composed of only a single wire or be composed of a bundle of plural single wires. Furthermore, the internal conductor 1 is not particularly limited in terms of conductor diameter or conductor material, and it can be suitably determined depending on use.

<Flame Retardant Resin Composition>

On the other hand, the flame retardant resin composition is prepared. As described above, the flame retardant resin composition of one or more embodiments contains a polyolefin resin, a silicone compound, a fatty acid containing compound, aluminum hydroxide, and a triazine ring containing hindered amine compound.

(1) Polyolefin Resin

In some embodiments, examples of the polyolefin resin include a polyolefin resin containing an ethylene unit such as polyethylene (PE), acid-modified polyethylene, an ethylene-vinyl acetate copolymer (EVA), an ethylene-ethyl acrylate copolymer (EEA), an ethylene-methyl acrylate copolymer (EMA), an ethylene-propylene copolymer, an ethylene-butene copolymer, an ethylene-hexene copolymer, an ethylene-octene copolymer; a polyolefin resin which contains a propylene unit and does not contain an ethylene unit such as polypropylene (PP); and an olefin-based thermoplastic elastomer. They can be used either singly or in combination of two or more types thereof. Among them, it is preferable that the polyolefin resin be composed of at least one kind selected from the group consisting of polyethylene, acid-modified polyethylene, an ethylene-vinyl acetate copolymer, an ethylene-ethyl acrylate copolymer, and polypropylene.

(2) Silicone Compound

The silicone compound of one or more embodiments functions as a flame retardant aid, and examples of the silicone compound include polyorganosiloxane. Herein, the polyorganosiloxane has a siloxane bond in the main chain and an organic group in the side chain. Examples of the organic group include a methyl group, a vinyl group, an ethyl group, a propyl group, and a phenyl group. Specific examples of the polyorganosiloxane include dimethyl polysiloxane, methylethyl polysiloxane, methyloctyl polysiloxane, methylvinyl polysiloxane, methylphenyl polysiloxane, and methyl(3,3,3-trifluoropropyl)polysiloxane. The polyorganosiloxane is used in the form of silicone oil, silicone powder, silicone gum, or silicone resin. In particular, the polyorganosiloxane is preferably used in the form of silicone gum. In such embodiments, blooming is less likely to occur in the flame retardant resin composition.

As described in the above, the silicone compound of one or more embodiments is blended at a ratio of 0.5 part by mass or more and 10 parts by mass or less relative to 100 parts by mass of the polyolefin resin. In such embodiments, more excellent flame retardancy is obtained in the flame retardant resin composition as compared to a case in which the blending ratio of the silicone compound is less than 0.5 part by mass. Furthermore, when the blending ratio of the silicone compound relative to 100 parts by mass of the polyolefin resin is within the above range, unevenness of the flame retardancy is smaller as compared to a case in which the blending ratio of the silicone compound is more than 10 parts by mass. This is because, as it becomes easier for the silicone compound to be uniformly blended in the polyolefin resin, a lump is less likely to partially occur.

In one or more embodiments the blending ratio of the silicone compound relative to 100 parts by mass of the polyolefin resin is preferably 7 parts by mass or less. In such embodiments, more excellent mechanical characteristics are obtained in the flame retardant resin composition as compared to a case in which the blending ratio of the silicone compound exceeds 7 parts by mass.

In one or more embodiments the blending ratio of the silicone compound relative to 100 parts by mass of the polyolefin resin is preferably less than 5 parts by mass. In such embodiments, more excellent mechanical characteristics are obtained in the flame retardant resin composition as compared to a case in which the blending ratio of the silicone compound is 5 parts by mass or more.

In one or more embodiments the blending ratio of the silicone compound relative to 100 parts by mass of the polyolefin resin is preferably 1 part by mass or more. In such embodiments, more excellent flame retardancy is obtained in the flame retardant resin composition as compared to a case in which the blending ratio of the silicone compound is less than 1 part by mass. The blending ratio of the silicone compound relative to 100 parts by mass of the polyolefin resin is more preferably 2 parts by mass or more.

In one or more embodiments the silicone compound may be attached in advance on a surface of aluminum hydroxide. In such embodiments, segregation of the silicone compound is less likely to occur in the flame retardant resin composition, and thus uniformity of the characteristics of the flame retardant resin composition is further improved.

Examples of a method of obtaining the silicone compound attached to the surface of aluminum hydroxide include a method in which the silicone compound is added to aluminum hydroxide to obtain a mixture, the mixture is dried for 10 to 40 minutes at 40 to 75° C., and the dried mixture is pulverized using a Henschel mixer, an atomizer, or the like, for example.

(3) Fatty Acid Containing Compound

In one or more embodiments the fatty acid containing compound functions as a flame retardant aid. The fatty acid containing compound refers to a compound containing a fatty acid or a metal salt thereof. Herein, as the fatty acid, a fatty acid having carbon atom number of 12 to 28 is used, for example. Examples of such a fatty acid include lauric acid, myristic acid, palmitic acid, stearic acid, tuberculostearic acid, oleic acid, linoleic acid, arachidonic acid, behenic acid, and montanic acid. Among them, stearic acid or tuberculostearic acid is preferable as the fatty acid, and stearic acid is particularly preferable. In such embodiments, more excellent flame retardancy is obtained in the flame retardant resin composition as compared to a case in which a fatty acid other than tuberculostearic acid or stearic acid is used.

In one or more embodiments the fatty acid containing compound is preferably a fatty acid metal salt. Examples of the metal constituting the fatty acid metal salt include magnesium, calcium, zinc and lead. As the fatty acid metal salt, magnesium stearate or calcium stearate is preferable. In such embodiments, more excellent flame retardancy can be obtained in a smaller addition amount in the flame retardant resin composition as compared to a case in which a fatty acid metal salt other than magnesium stearate and calcium stearate is used.

As described above, in some embodiments the fatty acid containing compound is blended at a ratio of 0.5 part by mass or more and 20 parts by mass or less relative to 100 parts by mass of the polyolefin resin. In such embodiments, more excellent flame retardancy is obtained in the flame retardant resin composition as compared to a case in which the blending ratio of the fatty acid containing compound is less than 0.5 part by mass. Furthermore, when the blending ratio of the fatty acid containing compound relative to 100 parts by mass of the polyolefin resin is within the above range, bleeding is less likely to occur as compared to a case in which the blending ratio of the fatty acid containing compound relative to 100 parts by mass of the polyolefin resin is more than 20 parts by mass.

In one or more embodiments the blending ratio of the fatty acid containing compound relative to 100 parts by mass of the polyolefin resin is preferably 15 parts by mass or less, more preferably 10 parts by mass or less, and still more preferably 5 parts by mass or less. In a case in which the blending ratio of the fatty acid containing compound relative to 100 parts by mass of the polyolefin resin is within the above range, more excellent mechanical characteristics are obtained in the flame retardant resin composition as compared to a case in which the blending ratio is out of the respective range described above. However, the blending ratio of the fatty acid containing compound relative to 100 parts by mass of the polyolefin resin is preferably 2 parts by mass or more, more preferably 3 parts by mass or more.

In one or more embodiments the fatty acid containing compound can be attached in advance on a surface of aluminum hydroxide. In such embodiments, segregation of the fatty acid containing compound is less likely to occur in the flame retardant resin composition, and thus uniformity in the characteristics of the flame retardant resin composition is further improved. The fatty acid containing compound and the silicone compound can be attached in advance on a surface of aluminum hydroxide. In such embodiments, segregation of the silicone compound and the fatty acid containing compound is less likely to occur in the flame retardant resin composition, and thus uniformity of the characteristics of the flame retardant resin composition is further improved.

Examples of a method of obtaining the silicone compound and the fatty acid containing compound attached to the surface of aluminum hydroxide include a method in which the silicone compound and the fatty acid containing compound are added to aluminum hydroxide, are mixed with aluminum hydroxide to obtain a mixture, the mixture is dried for 10 to 40 minutes at 40 to 75° C., and the dried mixture is pulverized using a Henschel mixer, an atomizer, or the like, for example.

(4) Aluminum Hydroxide

In one or more embodiments the aluminum hydroxide is blended at a ratio of 1 part by mass or more and 60 parts by mass or less relative to 100 parts by mass of the polyolefin resin. In such embodiments, more excellent flame retardancy is obtained in the flame retardant resin composition as compared to a case in which the blending ratio of aluminum hydroxide is less than 1 part by mass relative to 100 parts by mass of the polyolefin resin.

Furthermore, when the blending ratio of aluminum hydroxide relative to 100 parts by mass of the polyolefin resin is within the above range, the mechanical characteristics of the flame retardant resin composition can be further improved as compared to a case in which the blending ratio of aluminum hydroxide relative to 100 parts by mass of the polyolefin resin is more than 60 parts by mass.

Moreover, in one or more embodiments, the blending ratio of aluminum hydroxide relative to 100 parts by mass of the polyolefin resin is preferably less than 50 parts by mass, more preferably less than 40 parts by mass, and still more preferably 30 parts by mass or less, even still more preferably 20 parts by mass or less, and particularly preferably less than 5 parts by mass. In a case in which the blending ratio of aluminum hydroxide relative to 100 parts by mass of the polyolefin resin is within the above range, the mechanical characteristics can be more sufficiently improved while more excellent flame retardancy of the flame retardant resin composition can be more sufficiently secured as compared to a case in which the blending ratio is out of each range described above.

In one or more embodiments the blending ratio of aluminum hydroxide relative to 100 parts by mass of the polyolefin resin is preferably 3 parts by mass or more. In a case in which the blending ratio of aluminum hydroxide relative to 100 parts by mass of the polyolefin resin is within the above range, the flame retardancy of the flame retardant resin composition can be more sufficiently secured.

In particular, in embodiments in which the blending ratio of the fatty acid containing compound relative to 100 parts by mass of the polyolefin resin is 0.5 part by mass or more and 10 parts by mass or less, the blending ratio of aluminum hydroxide relative to 100 parts by mass of the polyolefin resin is preferably 1 part by mass or more and less than 5 parts by mass. In such embodiments, as compared to a case in which the blending ratios of the fatty acid containing compound and aluminum hydroxide relative to 100 parts by mass of the polyolefin resin exceed the above upper limits, more excellent mechanical characteristics can be obtained in the flame retardant resin composition. Furthermore, more excellent flame retardancy can be obtained in the flame retardant resin composition as compared to a case in which the blending ratios of the fatty acid containing compound and aluminum hydroxide relative to 100 parts by mass of the polyolefin resin are less than the above lower limits.

Aluminum hydroxide may be only a metal hydroxide contained in the flame retardant resin composition or may not be only a metal hydroxide, but is preferably only a metal hydroxide. Namely, it is preferable that a metal hydroxide contained in the flame retardant resin composition is composed of only aluminum hydroxide. In such embodiments, as compared to a case in which aluminum hydroxide is not only a metal hydroxide contained in the flame retardant resin composition, more excellent flame retardancy can be obtained in the flame retardant resin composition.

(5) Triazine Ring Containing Hindered Amine Compound

In one or more embodiments, the triazine ring containing hindered amine compound is a hindered amine compound containing a triazine ring and is not particularly limited as long as it includes an oxygen atom in the molecule. However, it is preferable that the triazine ring containing hindered amine compound be a compound which has a group represented by the following formula (1). In such embodiments, more excellent flame retardancy can be obtained in the flame retardant resin composition.

[Chem. 2]

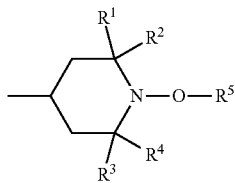

(1)

In the above formula (1), $R^1$ to $R^4$ are each independently an alkyl group having 1 to 8 carbon atoms, $R^5$ is an alkyl group having 1 to 18 carbon atoms, a cycloalkyl group having 5 to 12 carbon atoms, an aralkyl group having 7 to 25 carbon atoms, and an aryl group having 6 to 12 carbon atoms.

In the above formula (1), examples of the alkyl group which is represented by $R^1$ to $R^4$ include a methyl group, an ethyl group, a propyl group, a butoxy group, a pentyl group, and a hexyl group.

Herein, not only an unsubstituted alkyl group but also a substituted alkyl group is included in the "alkyl group". As the substituted alkyl group, a substituted alkyl group in which the hydrogen atom of an unsubstituted alkyl group is substituted with a halogen atom such as chlorine can be used.

In the above formula (1), examples of the alkyl group which is represented by $R^5$ in the above formula (1) include a methyl group, an ethyl group and a propyl group.

Examples of the cycloalkyl group which is represented by $R^5$ include a cyclopentyl group and a cyclohexyl group.

Examples of the aralkyl group which is represented by $R^5$ include a benzyl group.

Examples of the aryl group which is represented by $R^5$ include a phenyl group and a naphthyl group.

Examples of the triazine ring containing hindered amine compound which has a group represented by the above formula (1) include a compound that is represented by the following formula (2).

[Chem. 3]

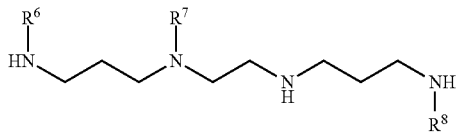

(2)

(in the above formula (2), $R^6$ to $R^8$ are each independently a group represented by the following formula (3)).

[Chem. 4]

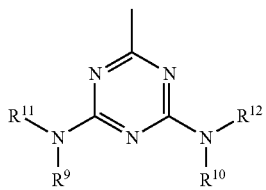

(3)

in the above formula (3), $R^9$ and $R^{10}$ each independently represent a group represented by the above formula (1), and $R^{11}$ and $R^{12}$ each independently represent an alkyl group having 1 to 18 carbon atoms).

Specific examples of the triazine ring containing hindered amine compound include a compound which is represented by the above formula (2) and in which $R^1$ to $R^4$ are methyl groups and $R^5$ is a cyclohexyl group in the formula (1), $R^{11}$ and $R^{12}$ are a butyl group in the formula (3), $R^6$ to $R^8$ are mutually the same, and $R^9$ and $R^{10}$ are mutually the same (trade name: "FLAMESTAB NOR 116FF", manufactured by BASF SE).

The triazine ring containing hindered amine compound is blended at a ratio of 0.05 part by mass or more and 8 parts by mass or less relative to 100 parts by mass of the polyolefin resin.

In such embodiments, more excellent flame retardancy can be obtained as compared to a case in which the blending ratio of the triazine ring containing hindered amine compound relative to 100 parts by mass of the polyolefin resin is less than 0.05 part by mass. Furthermore, when the blending ratio of the triazine ring containing hindered amine compound relative to 100 parts by mass of the polyolefin resin is within the above range, the mechanical characteristics and flame retardancy of the flame retardant resin composition can be further improved as compared to a case in which the blending ratio of the triazine ring containing hindered amine compound relative to 100 parts by mass of the polyolefin resin is more than 8 parts by mass.

Furthermore, in one or more embodiments, the blending ratio of the triazine ring containing hindered amine compound relative to 100 parts by mass of the polyolefin resin is preferably 0.1 part by mass or more. In such embodiments, more excellent flame retardancy can be obtained in the flame retardant resin composition as compared to a case in which the blending ratio of the triazine ring containing hindered amine compound relative to 100 parts by mass of the polyolefin resin is less than 0.1 part by mass. Furthermore, the blending ratio of the triazine ring containing hindered amine compound relative to 100 parts by mass of the polyolefin resin is more preferably 0.3 part by mass or more, still more preferably 0.5 part by mass or more, and particularly preferably 1 part by mass or more.

Furthermore, in one or more embodiments, the blending ratio of the triazine ring containing hindered amine compound relative to 100 parts by mass of the polyolefin resin is preferably 5 parts by mass or less, more preferably 3 parts by mass or less, and still more preferably 2 parts by mass or less. In such embodiments, blooming is less likely to occur in the flame retardant resin composition as compared to a case in which the blending ratio of the triazine ring containing hindered amine compound relative to 100 parts by mass of the polyolefin resin is out of the respective range described above.

In one or more embodiments, the flame retardant resin composition may include a filler such as an anti-oxidant, a UV degradation preventing agent, a processing aid, a coloring pigment, a lubricating agent, carbon black, or the like, if necessary.

In one or more embodiments, the flame retardant resin composition can be obtained by kneading the polyolefin resin, the silicone compound, the fatty acid containing compound, the aluminum hydroxide, the triazine ring containing hindered amine compound and the like. Kneading can be carried out by using a kneading machine such as a Banbury mixer, a tumbler, a pressure kneader, a kneading extruder, a twin screw extruder, a mixing roll, for example. At this time, a master batch (MB) obtained by kneading a part of the polyolefin resin and the silicone compound may be kneaded with the remaining polyolefin resin, the fatty acid containing compound, aluminum hydroxide, the triazine ring containing hindered amine compound and the like from the viewpoint of improving the dispersibility of the silicone compound.

Next, the internal conductor 1 is covered with the flame retardant resin composition. Specifically, the flame retardant resin composition is melt-kneaded using an extruding machine to form a tubular extrudate. Then, the tubular extrudate is continuously coated onto the internal conductor 1. Thus, the insulating wire 4 is obtained.

<Outer Sheath>

Finally, one insulating wire 4 which has been obtained as described above is prepared, and this insulating wire 4 is covered with the outer sheath 3 which has been prepared using the flame retardant resin composition described above. The outer sheath 3 is a so-called sheath, and it protects the insulating body 2 from physical or chemical damages.

Thus, the round cable 10 is obtained.

[Molded Article]

One or more embodiments of the present invention are directed towards a molded article composed of the flame retardant resin composition described above.

This molded article can secure excellent mechanical characteristics as well as excellent flame retardancy.

In one or more embodiments, the above molded article can be obtained by a general molding method such as an injection molding method or an extrusion molding method.

The present invention is not limited to the above embodiment. For example, although the round cable 10 having one insulating wire 4 is used as a metal cable in the above embodiment, the metal cable of one or more embodiments of the present invention may be a cable which has a metal conductor and an insulating body covering the metal conductor, and is not limited to a round cable. Accordingly, the metal cable of one or more embodiments of the present invention may be a metal cable which has two or more insulating wire 4 on the inner side of the outer sheath 3. Furthermore, in one or more embodiments, a resin part consisting of polypropylene or the like may be provided between the outer sheath 3 and the insulating wire 4.

Furthermore, in one or more embodiments, although the insulating body 2 and the outer sheath 3 of the insulating wire 4 is composed of the flame retardant resin composition in the above embodiment, the insulating body 2 may be composed of a typical insulating resin and only the outer sheath 3 may be composed of the flame retardant resin composition. Furthermore, the insulating body 2 is not necessarily required, and it can be omitted.

Figure 3:
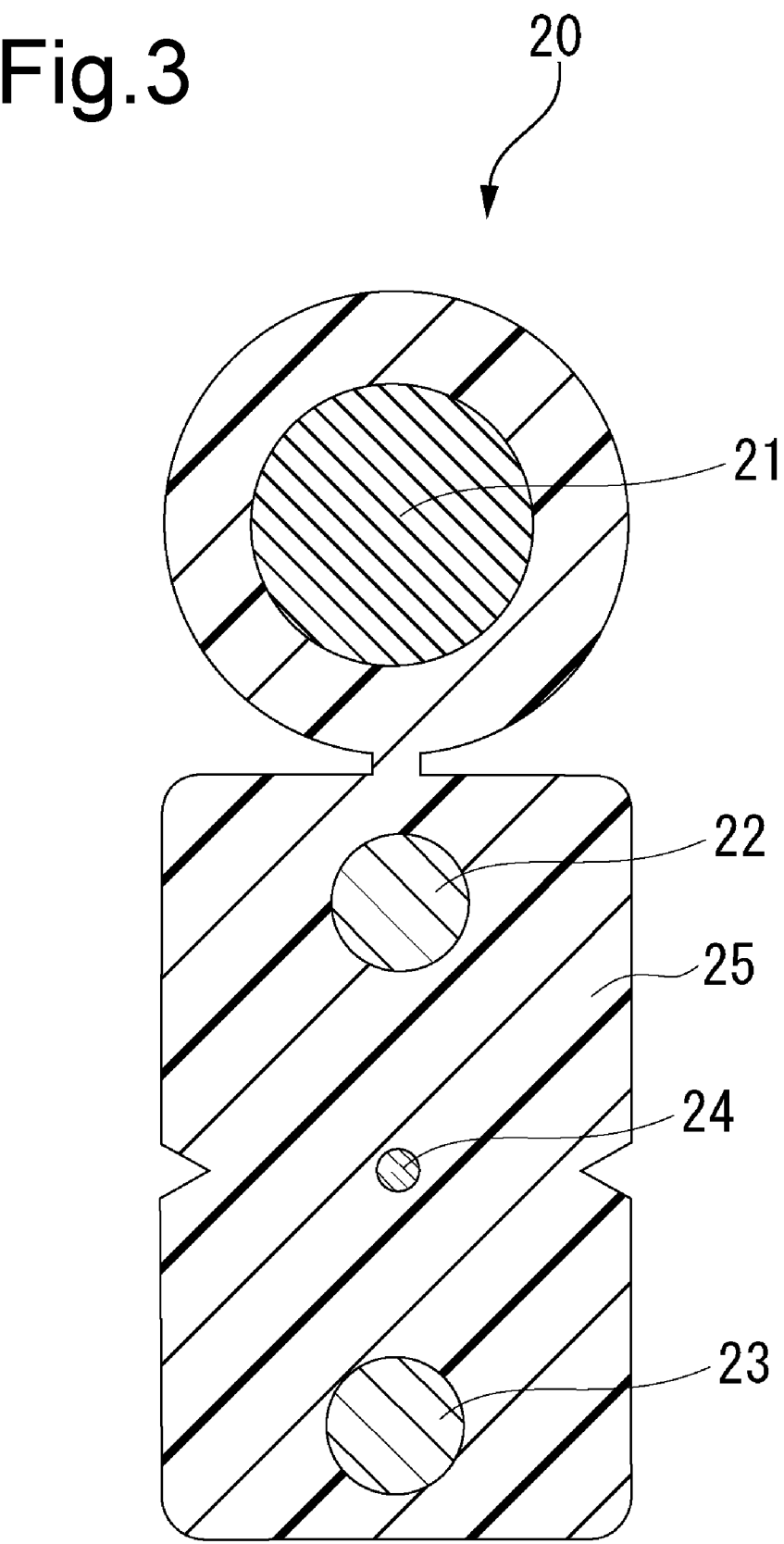
FIG. 3 is a cross-sectional view illustrating an embodiment of the optical fiber cable of one or more embodiments of the present invention.

Furthermore, in one or more embodiments, in the above embodiment, the flame retardant resin composition constituting the insulating body 2 and the outer sheath 3 of the insulating wire 4 can also be applied to an insulating body in an optical fiber cable which has an optical fiber and the insulating body covering the optical fiber. For example, FIG. 3 is a cross-sectional view illustrating a drop type optical fiber cable as an embodiment of the optical fiber cable. As shown in FIG. 3, an optical fiber cable 20 is provided with a supporting line 21, two tension members 22 and 23, an optical fiber 24, and an outer sheath 25 as an insulating body covering them. Herein, the outer sheath 25 is composed of the flame retardant resin composition which constitutes the insulating body 2 of the insulating wire 4 and the outer sheath 3 in the above embodiment.

Furthermore, in one or more embodiments, the flame retardant resin composition of one or more embodiments of the present invention can be applied not only to the insulating body of the metal cable and the optical fiber cable described above but also to various uses such as tubes, tapes, wrapping materials, and building materials for which flame retardancy is required.

EXAMPLES

Hereinbelow, one or more embodiments of the present invention are more specifically explained in view of Examples and Comparative Examples. However, embodiments of the present invention are not limited to the following Examples.

Examples 1 to 25 and Comparative Examples 1 to 8

Polyethylene as a polyolefin resin (hereinafter referred to as "polyethylene A"), a silicone master batch (a silicone MB), a fatty acid containing compound, aluminum hydroxide, and a triazine ring containing hindered amine compound were blended in the blending amount shown in Tables 1 to 7, and kneaded for 15 minutes at 160° C. by a Banbury mixer and flame retardant resin compositions were obtained. Herein, the silicone MB is a mixture of polyethylene as a polyolefin resin (hereinafter referred to as "polyethylene B") and silicone gum. Incidentally, in Tables 1 to 7, unit of the blending amount for each blending component is parts by mass. Furthermore, although in Tables 1 to 7, the blending amount of polyethylene A as a polyolefin resin is not 100 parts by mass except for comparative examples 6 and 7, a polyolefin resin in the base resin is composed of a mixture of polyethylene A and polyethylene B in the silicone MB, and the total becomes 100 parts by mass when the blending amount of polyethylene A and the blending amount of polyethylene B in the silicone MB are added.

<Specific Gravity>

For the flame retardant resin compositions of examples 1 to 25 and comparative examples 1 to 8, specific gravity was measured by an underwater substitution method based on JIS K7112. The results are shown in Tables 1 to 7.

As the above polyolefin resin, the silicone MB, the aluminum hydroxide, the fatty acid containing compound, and the triazine ring containing hindered amine compound, the followings were specifically used.

(1) Polyolefin resin
Polyethylene A: manufactured by Sumitomo Chemical Company Limited (2) Silicone MB: manufactured by Shin-Etsu Chemical Co., Ltd. (containing 50% by mass of silicone gum and 50% by mass of Polyethylene B)

(3) Aluminum hydroxide: manufactured by Nippon Light Metal Co., Ltd., average particle diameter of 1.2 μm (4) Fatty Acid Containing Compound
Magnesium stearate: manufactured by ADEKA Corporation
Zinc stearate: manufactured by NOF Corporation
Calcium stearate: manufactured by SAKAI CHEMICAL INDUSTRY CO., LTD.
Stearic acid: manufactured by NOF CORPORATION
Behenic acid: manufactured by NOF CORPORATION
Montanic acid: manufactured by Clariant (Japan) K.K.

(5) Triazine ring containing hindered amine compound: manufactured by BASF SE

A compound which is represented by the above formula (2) and in which $R^1$ to $R^4$ are a methyl group and $R^5$ is a cyclohexyl group in the formula (1), and, $R^{11}$ and $R^{12}$ in the formula (3) are a butyl group, $R^6$ to $R^8$ are mutually the same and $R^9$ and $R^{10}$ are mutually the same.

Subsequently, the flame retardant resin compositions were charged into a single-screw extruder (L/D=20, screw shape: full flight screw, manufactured by Marth Seiki Co., Ltd.), and tubular extrudates were extruded from the extruder and coated on one conductor (number of single wire: 1 piece/cross section area: 2 mm$^2$) to have a thickness of 0.7 mm. Thus, insulating wires were obtained.

TABLE 1

| | | | Comparative Example 1 | Example 1 | Example 2 | Example 3 | Example 4 | Example 5 | Comparative Example 2 |
|---|---|---|---|---|---|---|---|---|---|
| Composition | Polyolefin resin | Polyethylene A | 97 | 97 | 97 | 97 | 97 | 97 | 97 |
| | Silicone MB | Polyethylene B/Silicone gum | 3/3 | 3/3 | 3/3 | 3/3 | 3/3 | 3/3 | 3/3 |
| | Fatty acid containing compound | Magnesium stearate | 5 | 5 | 5 | 5 | 5 | 5 | 5 |
| | Aluminum hydroxide | | 3 | 3 | 3 | 3 | 3 | 3 | 3 |
| | Triazine ring containing hindered amine compound | | | 0.05 | 0.1 | 0.5 | 5 | 8 | 10 |
| Characteristics | Flame retardancy | Vertical flame test Pass rate (%) | 0 | 100 | 100 | 100 | 100 | 100 | 60 |
| | Mechanical characteristics | Tensile strength (MPa) | 19.2 | 19.4 | 19.5 | 19.3 | 18.8 | 18.5 | 18.7 |
| | | Specific gravity | 0.97 | 0.98 | 0.97 | 0.97 | 0.98 | 0.99 | 1.00 |

TABLE 2

| | | | Comparative Example 3 | Example 6 | Example 2 | Example 7 | Example 8 |
|---|---|---|---|---|---|---|---|
| Composition | Polyolefin resin | Polyethylene A | 97 | 97 | 97 | 97 | 97 |
| | Silicone MB | Polyethylene B/Silicone gum | 3/3 | 3/3 | 3/3 | 3/3 | 3/3 |
| | Fatty acid containing compound | Magnesium stearate | 5 | 5 | 5 | 5 | 5 |
| | Aluminum hydroxide | | | 1 | 3 | 5 | 20 |
| | Triazine ring containing hindered amine compound | | 0.1 | 0.1 | 0.1 | 0.1 | 0.1 |
| Characteristics | Flame retardancy | Vertical flame test Pass rate (%) | 0 | 100 | 100 | 100 | 100 |
| | Mechanical characteristics | Tensile strength (MPa) | 19.7 | 19.5 | 19.5 | 19.1 | 16.0 |
| | | Specific gravity | 0.95 | 0.96 | 0.97 | 0.98 | 1.04 |

TABLE 3

| | | | Example 9 | Example 10 | Example 11 | Example 12 | Comparative Example 4 |
|---|---|---|---|---|---|---|---|
| Composition | Polyolefin resin | Polyethylene A | 97 | 97 | 97 | 97 | 97 |
| | Silicone MB | Polyethylene B/Silicone gum | 3/3 | 3/3 | 3/3 | 3/3 | 3/3 |
| | Fatty acid containing | Magnesium stearate | 5 | 5 | 5 | 5 | 5 |

TABLE 3-continued

|  |  |  | Example 9 | Example 10 | Example 11 | Example 12 | Comparative Example 4 |
|---|---|---|---|---|---|---|---|
|  | compound |  |  |  |  |  |  |
|  | Aluminum hydroxide |  | 30 | 40 | 50 | 60 | 100 |
|  | Triazine ring containing hindered amine compound |  | 0.1 | 0.1 | 0.1 | 0.1 | 0.1 |
| Characteristics | Flame retardancy | Vertical flame test Pass rate (%) | 100 | 100 | 100 | 100 | 30 |
|  | Mechanical characteristics | Tensile strength (MPa) | 15.3 | 14.7 | 14.1 | 13.5 | 9.5 |
|  | Specific gravity |  | 1.07 | 1.10 | 1.14 | 1.18 | 1.32 |

TABLE 4

|  |  |  | Comparative Example 5 | Example 13 | Example 14 | Example 15 | Example 16 | Example 17 |
|---|---|---|---|---|---|---|---|---|
| Composition | Polyolefin resin | Polyethylene A | 97 | 97 | 97 | 97 | 97 | 97 |
|  | Silicone MB | Polyethylene B/Silicone gum | 3/3 | 3/3 | 3/3 | 3/3 | 3/3 | 3/3 |
|  | Fatty acid containing compound | Magnesium stearate |  | 0.5 | 2 | 5 | 10 | 20 |
|  | Aluminum hydroxide |  | 5 | 5 | 5 | 5 | 5 | 5 |
|  | Triazine ring containing hindered amine compound |  | 0.5 | 0.5 | 0.5 | 0.5 | 0.5 | 0.5 |
| Characteristics | Flame retardancy | Vertical flame test Pass rate (%) | 0 | 100 | 100 | 100 | 100 | 100 |
|  | Mechanical characteristics | Tensile strength (MPa) | 19.7 | 19.8 | 19.8 | 19.0 | 17.8 | 15.8 |
|  | Specific gravity |  | 0.97 | 0.96 | 0.97 | 0.98 | 1.00 | 1.01 |

TABLE 5

|  |  |  | Comparative Example 6 | Example 18 | Example 15 | Example 19 |
|---|---|---|---|---|---|---|
| Composition | Polyolefin resin | Polyethylene A | 100 | 99.5 | 97 | 90 |
|  | Silicone MB | Polyethylene B/Silicone gum |  | 0.5/0.5 | 3/3 | 10/10 |
|  | Fatty acid containing compound | Magnesium stearate | 5 | 5 | 5 | 5 |
|  | Aluminum hydroxide |  | 5 | 5 | 5 | 5 |
|  | Triazine ring containing hindered amine compound |  | 0.5 | 0.5 | 0.5 | 0.5 |
| Characteristics | Flame retardancy | Vertical flame test Pass rate (%) | 0 | 100 | 100 | 100 |
|  | Mechanical characteristics | Tensile strength (MPa) | 19.5 | 19.6 | 19.0 | 17.0 |
|  | Specific gravity |  | 0.99 | 0.99 | 0.98 | 1.00 |

TABLE 6

|  |  |  | Comparative Example 7 | Comparative Example 8 | Example 20 |
|---|---|---|---|---|---|
| Composition | Polyolefin resin | Polyethylene A | 100 | 99.5 | 97 |
|  | Silicone MB | Polyethylene B/Silicone gum |  | 0.5/0.5 | 3/3 |
|  | Fatty acid containing compound | Magnesium stearate |  | 5 | 5 |

TABLE 6-continued

|  |  |  |  | Comparative Example 7 | Comparative Example 8 | Example 20 |
|---|---|---|---|---|---|---|
|  | Aluminum hydroxide |  |  | 5 | 5 | 5 |
|  | Triazine ring containing hindered amine compound |  |  | 0.5 |  | 5 |
| Characteristics | Flame retardancy | Vertical flame test | Pass rate (%) | 0 | 0 | 100 |
|  | Mechanical characteristics | Tensile strength (MPa) |  | 19.8 | 19.7 | 18.7 |
|  | Specific gravity |  |  | 0.98 | 0.99 | 0.99 |

TABLE 7

|  |  |  | Example 3 | Example 21 | Example 22 | Example 23 | Example 24 | Example 25 |
|---|---|---|---|---|---|---|---|---|
| Composition | Polyolefin resin | Polyethylene A | 97 | 97 | 97 | 97 | 97 | 97 |
|  | Silicone MB | Polyethylene B/Silicone gum | 3/3 | 3/3 | 3/3 | 3/3 | 3/3 | 3/3 |
|  | Fatty acid containing compound | Magnesium stearate | 5 |  |  |  |  |  |
|  |  | Zinc stearate |  | 5 |  |  |  |  |
|  |  | Calcium stearate |  |  | 5 |  |  |  |
|  |  | Stearic acid |  |  |  | 5 |  |  |
|  |  | Behenic acid |  |  |  |  | 5 |  |
|  |  | Motanic acid |  |  |  |  |  | 5 |
|  | Aluminum hydroxide |  | 3 | 3 | 3 | 3 | 3 | 3 |
|  | Triazine ring containing hindered amine compound |  | 0.5 | 0.5 | 0.5 | 0.5 | 0.5 | 0.5 |
| Characteristics | Flame retardancy | Vertical flame test Pass rate (%) | 100 | 100 | 100 | 100 | 100 | 100 |
|  | Mechanical characteristics | Tensile strength (MPa) | 19.3 | 19.1 | 19.5 | 19.0 | 19.5 | 19.2 |
|  | Specific gravity |  | 0.97 | 0.97 | 0.97 | 0.97 | 0.97 | 0.97 |

For the insulating wires of Examples 1 to 25 and Comparative Examples 1 to 8 which were obtained as described above, evaluations regarding flame retardancy and mechanical characteristics were made as follows.

<Flame Retardancy>

For 10 insulating wires which were obtained from each of Examples 1 to 25 and Comparative Examples 1 to 8, a vertical combustion test was carried out based on JIS C3665-1. Incidentally, flame-contact time by a burner was set to 60 seconds. Ratios of the insulating wires which satisfy the requirements of the following (A) among the 10 insulating wires were set as pass rate (unit: %) and calculated based on the following formula. The results are shown in Tables 1 to 7. Incidentally, in Tables 1 to 7, the criteria for determining the pass or failure in terms of flame retardancy were as described below.

Pass rate (%)=100×Number of insulating wires satisfying both the above criteria (A)/Total number of insulating wires subjected to test (10 pieces)

(A) The distance between the bottom end of a top support member supporting the insulating wire from the top and the start point of carbonization is 50 mm or more, and combustion of the insulating wire was not spread over 540 mm or lower from the bottom end of the top support member.
(Criteria for Determining the Pass or Failure)
Pass: pass rate of 80% or higher
Failure: pass rate of lower than 80%
<Mechanical Characteristics>
Evaluation of the mechanical characteristics was carried out based on the tensile strength which was measured by performing the tensile test according to JIS C3005 for the insulating wires of Examples 1 to 25 and Comparative Examples 1 to 8. The results are shown in Tables 1 to 7. In Tables 1 to 7, unit of the tensile strength is MPa, and the criteria for determining the pass or failure in terms of tensile strength were as described below. Incidentally, in the tensile test, the tensile speed was 200 mm/min and the gauge length was 20 mm.

10 MPa or higher: pass
Lower than 10 MPa: failure

From the results of Tables 1 to 7, the flame retardant resin compositions of Examples 1 to 25 satisfied the pass criteria regarding the flame retardancy and mechanical characteristics. In contrast, the flame retardant resin compositions of Comparative Examples 1 to 8 did not satisfy the pass criteria regarding at least one of the flame retardancy and mechanical characteristics.

From the above, it was confirmed that excellent mechanical characteristics and also excellent flame retardancy can be secured according to the flame retardant resin composition of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

EXPLANATIONS OF REFERENCE NUMERALS

1 . . . Internal conductor (metal conductor)
2 . . . Insulating body (molded article)

3 ... Outer sheath (insulating body, molded article)
4 ... Insulating wire
10 ... Round cable (metal cable)
20 ... Optical fiber cable
24 ... Optical fiber
25 ... Outer sheath (insulating body, molded article)

The invention claimed is:

1. A flame retardant resin composition comprising:
a polyolefin resin;
a silicone compound;
a fatty acid containing compound;
aluminum hydroxide; and
a triazine ring containing hindered amine compound,
wherein the triazine ring containing hindered amine compound comprises a group represented by the following formula (1):

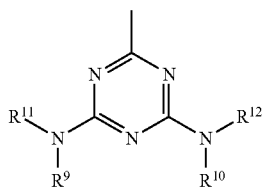
(1)

where $R^9$ and $R^{10}$ are each independently represent a group represented by the following formula (2), and $R^{11}$ and $R^{12}$ each independently represent an alkyl group having 1 to 18 carbon atoms:

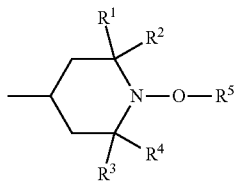
(2)

where $R^1$, $R^2$, $R^3$, and $R^4$ are each independently an alkyl group having 1 to 8 carbon atoms,
$R^5$ is an alkyl group having 1 to 18 carbon atoms, a cycloalkyl group having 5 to 12 carbon atoms, an aralkyl group having 7 to 25 carbon atoms, or an aryl group having 6 to 12 carbon atoms, and
wherein, with respect to 100 parts by mass of the polyolefin resin,
the silicone compound is blended in an amount of the range 0.5 to 10 parts by mass,
the fatty acid containing compound is blended in an amount of the range 0.5 to 20 parts by mass,
the aluminum hydroxide is blended in an amount of the range 1 to 60 parts by mass, and
the triazine ring containing hindered amine compound is blended in an amount of the range 0.05 to 8 parts by mass.

2. The flame retardant resin composition of claim 1, wherein the triazine ring containing hindered amine compound is blended in an amount of 3 parts by mass or less, relative to 100 parts by mass of the polyolefin resin.

3. The flame retardant resin composition of claim 1, wherein the aluminum hydroxide is blended in an amount of less than 50 parts by mass, relative to 100 parts by mass of the polyolefin resin.

4. The flame retardant resin composition of claim 3, wherein the aluminum hydroxide is blended in an amount of less than 40 parts by mass, relative to 100 parts by mass of the polyolefin resin.

5. The flame retardant resin composition of claim 1, wherein the fatty acid containing compound is blended in an amount of the range 0.5 to 10 parts by mass relative to 100 parts by mass of the polyolefin resin, and
the aluminum hydroxide is blended in an amount of the range 1 to 5 parts by mass, relative to 100 parts by mass of the polyolefin resin.

6. The flame retardant resin composition of claim 1, wherein the polyolefin resin is composed of at least one kind selected from the group consisting of polyethylene, acid-modified polyethylene, an ethylene-vinyl acetate copolymer, an ethylene-ethyl acrylate copolymer, and polypropylene.

7. The flame retardant resin composition of claim 1, wherein the fatty acid containing compound is magnesium stearate or calcium stearate.

8. The flame retardant resin composition of claim 1, wherein the composition has a specific gravity of 1 or less.

9. The flame retardant resin composition of claim 1, wherein the triazine ring containing hindered amine further comprises a group represented by the following formula (3):

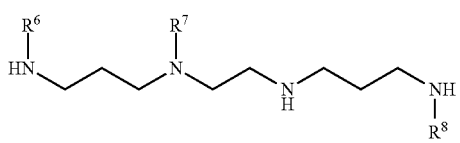
(3)

where $R^6$, $R^7$, and $R^8$ each independently represent a group represented by the formula (1).

10. A metal cable comprising:
a metal conductor; and
an insulating body covering the metal conductor,
wherein the insulating body is composed of the flame retardant resin composition of claim 1.

11. An optical fiber cable comprising:
an optical fiber; and
an insulating body covering the optical fiber,
wherein the insulating body is composed of the flame retardant resin composition of claim 1.

12. A molded article comprising the flame retardant resin composition of claim 1.

* * * * *